United States Patent Office 3,778,468
Patented Dec. 11, 1973

3,778,468
PROCESS FOR PREPARING ETHYLENE GLYCOL ESTERS
John Kollar, Wyckoff, N.J., assignor to Halcon International, Inc., New York, N.Y.
No Drawing. Continuation-in-part of application Ser. No. 819,507, Mar. 24, 1969, now Patent No. 3,689,535, which is a continuation-in-part of abandoned application Ser. No. 763,001, Sept. 26, 1968. This application June 27, 1972, Ser. No. 266,818
Int. Cl. C07c 67/04
U.S. Cl. 260—497 R    4 Claims

ABSTRACT OF THE DISCLOSURE

Ethylene glycol esters are prepared by the molecular oxygen oxidation of ethylene in the presence of a liquid phase reaction medium containing a carboxylic acid, with the reaction being catalyzed by cationic selenium and at least one member of the group consisting of elemental bromine, elemental chlorine, a bromine-containing compound and a chlorine-containing compound.

CROSS-REFERENCE TO RELATED APPLICATIONS

This is a continuation-in-part of U.S. application Ser. No. 819,507, filed Mar. 24, 1969, now U.S. Pat. 3,689,535, which in turn is a continuation-in-part of U.S. application Ser. No. 763,001, filed Sept. 26, 1968, now abandoned.

BACKGROUND OF THE INVENTION

This invention relates to a process for the preparation of carboxylate esters of ethylene glycol by the reaction of ethylene, molecular oxygen, and a carboxylic acid and is of particular significance in the commercial production of such esters.

A variety of processes have in recent years been proposed for the production of ethylene glycol esters by oxidation of ethylene in the presence of carboxylic acids. Many of these involve the use of oxygen as the oxidant, with the reaction being catalyzed by noble metals of Group VIII of the Periodic Table, typically palladium. Such processes have obvious drawbacks since they involve use of the extremely expensive noble metals and, as a consequence, also require additional capital expenditure to prevent loss of any noble metal from the process.

Others have proposed the use of lower cost catalytic systems in such oxygen oxidations. For example, Huguet, in U.S. Pat. No. 3,479,395, proposes the use of tellurium dioxide as a catalyst for the conversion of lower alkenes to, inter alia, the corresponding glycol esters. However, the Huguet process suffers from drawbacks attributable to the admittedly poor solubility characteristics of tellurium dioxide. This, in turn, appears to limit the quantity of catalyst that can be employed in the liquid phase wherein the oxidation reaction occurs and thus appears further to impose inherent constraints upon reaction rate.

Others have sought to prepare glycol esters by techniques avoiding the drawbacks outlined above. For example, Olson in U.S. Pat. 3,427,348 proposed to produce vicinal glycol esters of lower olefins by reacting such olefins with carboxylic acids in the presence of mineral acids and selenium dioxide. In this process, the selenium dioxide functions as the oxidant and molecular oxygen is not employed. Processes of this kind, however, are of inherently limited commercial significance for many reasons. Production of very large quantities of organometallic compounds seems inherent. The need for employment of essentially molar quantities of the dioxide imposes severe materials-handling problems and thereby increases costs. The necessity for separating and processing large quantities of mineral acids from the effluent further increases complexity and cost. Finally, the process gives poor selectivity of the reaction to desired glycol and glycol ester products, i.e., large quantities of materials such as ethanol and ethanol esters are concomitantly produced.

In contrast, by the process of this invention it has been found possible to produce esters of ethylene glycol by the reaction of ethylene with molecular oxygen and carboxylic acids with concomitant advantages of high selectivity and high rate and, at the same time, without the need for noble metals and without having to deal with materials of such notoriously poor solubility as tellurium dioxide.

SUMMARY OF THE INVENTION

It has now been found that ethylene glycol esters may be readily obtained in high yield and selectivity by intimately contacting, in the liquid phase, ethylene, oxygen and a carboxylic acid in the presence of cationic selenium and at least one member of the group consisting of bromine, chlorine, a bromine-containing compound which yields bromide ion during reaction and a chlorine-containing compound which yields chloride ions during reaction. Assuming the carboxylic acid to be acetic acid for illustrative purposes, the following chemical equations illustrate the primary chemical reactions involved in the process of this invention, but there is no intent to limit this invention to the specific embodiments illustrated:

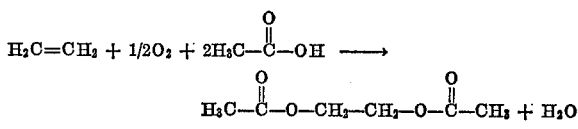

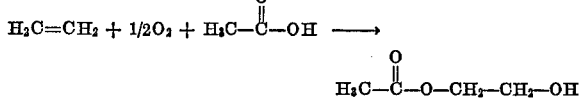

In my earlier applications, Ser. Nos. 763,001 and 819,507 (of which this is a continuation-in-part), the use of a selenium-halogen catalyst system is disclosed and exemplified. However, results there reported were not of significant advantage over then more preferred catalyst systems, most notably those employing cationic tellurium. This invention is founded on the discovery that cationic selenium can be employed to obtain significantly greater rates of reaction than heretofore thought possible, without loss in selectivity. Further, it has been found that the totality of glycol moieties present in the system (including diester, monoester and free glycol) are substantially greater than heretofore realized. Thus, overall yields obtained are comparable to those obtained with the tellurium-based system but with greater ease in handling.

As a consequence, the process of this invention is of particular advantage in facilitating the obtaining of high yields of ethylene glycol and ester derivatives thereof with high selectivities and at high rates with but few solids-handling problems. It is noteworthy that the process of this invention requires no initiators, and in practice essentially the only materials consumed are the reactants.

The process of this invention is conducted by introducing ethylene and molecular oxygen into contact with a liquid phase reaction medium comprising the carboxylic acid reactant. The liquid phase reaction medium is confined within an oxidation zone which can be a single vessel or a plurality of vessels connected in series or in parallel or both. The process can be conducted in batch or in continuous fashion, with continuous operation being preferred.

DETAILED DESCRIPTION OF THE INVENTION

The reactants

The three reactants involved in the instant process are (a) ethylene, (b) molecular oxygen and (c) a carboxylic acid. The ethylene employed need not be specially purified and can contain the normal amounts of the usual impurities found therein. For example, ethylene feedstocks containing up to 10 mole percent ethane are employable. The molecular oxygen reactant can be supplied as such (i.e., in concentrated form having an oxygen content of 85 mole percent or more) or can be supplied in the form of air or in the form of oxygen-enriched air or diluted air. As in the case of the ethylene reactant, the oxygen employed can contain the normal impurities.

The third reactant is the carboxylic acid. Suitable acids are the monobasic hydrocarbyl lower aliphatic acids having from 1 to 6 carbon atoms per molecule. These include formic acid, acetic acid, propionic acid, butyric acid, isobutyric and the valeric acids. Of these, the ones most desirably employed are formic acid, acetic acid and propionic acid. Acetic acid is the most preferred carboxylic acid reactant.

Mixtures of the foregoing carboxylic acids can be employed. Of course, when mixtures are used, mixed ester products are obtained.

As in the case of the other reactants, the carboxylic acid can be employed in any commercially available form, including aqueous solutions. It is preferred, however, to employ commercial acids having no more than 25% water and especially less than 15% water such as 90–98% acetic acid. The acids used can contain the various organic and inorganic impurities normally associated with the commercially available materials, and such impurities can be permitted to remain or can be removed as one desires. Unreacted acids containing impurities indigenous to the process can be recovered and recycled.

Reaction products

The product of greatest value obtained by the process of this invention is the diester of ethylene glycol. Obviously, the glycol moiety is attributable to the olefin reactant, while the acyl moiety of the ester corresponds to the carboxylic acid reactant or reactants. However, in the reaction, substantial amounts of valuable materials other than the diester are formed, valuable because they are precursors of the primarily desired diester product. Such precursors include glycol monoester, ethylene glycol itself and higher-boiling ether-alcohols (diethylene glycol, triethylene glycol) and ether-alcohol mono- and di-esters. Halogenated products are also formed, the halogen being a component of the catalyst system.

To illustrate: assuming the carboxylic acid reactant to be acetic acid and the halogen to be bromine, the reaction products include 1,2-diacetoxyethane; 2-acetoxyethane-1-ol; ethylene glycol; diethylene glycol; triethylene glycol; the mono- and di-acetate derivatives of diethylene glycol and triethylene glycol; ethylene bromohydrin; 2-bromoethyl acetate; 1,2-dibromoethane and brominated derivatives of the higher-boiling materials.

The liquid phase reaction medium

The liquid phase reaction medium, confined within the oxidation zone, is the environment in which the ester formation reaction occurs. This medium contains the carboxylic acid reactant, the catalyst system employed, the ester products of the reaction and precursors of the desired ester products of the reaction. Of course, dissolved ethylene and oxygen are also present. The normal composition of the reaction medium would comprise from 5 to 60 mole percent of carboxylic acid and from 5 to 60 mole percent of reaction products.

The catalyst system employed

The process of this invention requires an essentially two-component catalyst system. The first of these two components is cationic selenium. The second of these two components is bromide ion or chloride ion or mixtures of bromide and chloride ions. The selenium cation can be supplied to the system in any form which in solution or suspension under the oxidation conditions will yield at least some soluble cationic selenium. Thus, the selenium can be supplied to the system in the finely divided elemental form. Other suitable forms include the selenic acids and selenious acid as well as the inorganic salts of these acids, such as the ammonium salts and the alkali metal and alkaline earth metal salts. The oxide, oxyhalides, hydrides (selenine) and nitrides of selenium can also be used. Organoselenium compounds such as the alkyl or aryl selenine and haloselenines can be employed; thus, for example, such materials as methylene selenine, dimethyl selenine, dimethoxy selenene oxide, dimethoxy selenene dioxide, diethyl selenine, diethoxy selenene oxide, phenyl selenine (and the halogenated derivatives thereof, such as p-chlorophenyl selenine) phenyltrihydroxy selenene, diethoxy selenane dioxide, diphenyl selenine, diphenyl selenene oxide and the like are suitable. The use of elemental selenium, selenium oxide and the selenium acids (both selenic and selenious) is preferred since these are the most readily available forms.

The halogen component of the catalyst system can be supplied in elemental form which quickly reacts to produce chloride and bromide ion within the reaction system. Alternatively, one can use bromine- or chlorine-containing compounds which are capable of yielding the corresponding ions in solution under reaction conditions. Such compounds include the hydrohalic acids (gaseous or aqueous but preferably in the concentrated aqueous form), metal halides such as the alkali metal or alkaline earth metal halides or heavy metal bromides or chlorides. Organo-halogen-containing compounds can be employed including such materials as the alkyl halides, dihalides and trihalides. Particularly suitable organic forms include the halogenated derivatives of ethylene and the halogenated derivatives of the reaction products. For example, these materials include (assuming bromine to be the halogen employed) 1,2-dibromoethane; ethylene bromohydrin and 2-bromoethyl carboxylate.

Reaction conditions

The various reactants employed in the oxidation reaction may be effectively used over a wide range of concentrations. The effective minimum concentrations of catalyst will depend upon temperature, residence time and the type of halogen used. The amount of halogen (elemental or as a halogen compound, collectively referred to as "halogenated substance"), expressed in wt. percent of halogen based on total liquid phase reaction medium, can be from 0.01% to 30% or higher, desirably from 0.1% to about 20% and especially from about 0.5% to about 10%. The concentration of selenium cation present expressed in terms of equivalents of cation per equivalent of halogen can suitably vary from about 1:0.01 to about 1:100, but desirably from about 1:0.2 to about 1:40 and preferably from about 1:1 to about 1:20. The temperatures maintained in the oxidation zone may vary from about 50° C. to the bubble point of the liquid phase reaction mixture within the zone, with temperatures from about 90° C. to about 240° C. being preferred. Total pressures within the oxidation zone can be sub-atmospheric, atmospheric, or super-atmospheric, with pressure up to about 5,000 p.s.i.a. or higher being operable. Pressures from about 20 p.s.i.a. to about 1,000 p.s.i.a. are normally desired, while pressures from about 15 p.s.i.a. to about 1,000 p.s.i.a. and especially from about 50 p.s.i.a. to about 700 p.s.i.a. being particularly preferred.

The mole ratio of oxygen to ethylene is not critical and, therefore, any suitable ratio can be used. For example, such ratios as 1:1000 to 1:.001 may be used. Of course, care should be taken to avoid formation of flammable mixtures.

Reaction time, i.e., residence time within the reactor, can vary widely. Flow rates are preferably adjusted so that the rate of formation of product, measured as rate of formation of glycol diester, is from about 0.1 to about 10.0 gm.-moles per liter of liquid phase reaction medium per hour.

As hereinbefore indicated, the process of this invention can readily be employed in continuous operation, with the olefin reactant and molecular oxygen reactant being continuously introduced to the oxidation zone and being continuously reacted therewithin. In such a system, the carboxylic acid reactant normally would also be fed continuously to the oxidation zone, and the liquid phase reaction medium would normally be continuously withdrawn therefrom, the liquid phase reaction medium containing the desired ester products and their precursors. However, it should be noted that the carboxylic acid reactant can be introduced intermittently and the liquid phase reaction medium, containing the reaction products, can be withdrawn intermittently without thereby rendering the process other than a continuous one. The reaction can conveniently be carried out in one reaction vessel although, if desired, the reaction can be carried out in two or more vessels connected in series, parallel or both. Intermediate products such as, for example, ethyl bromide; 1,2-dibromoethane and/or 2-bromoethyl carboxylate or other ethylene glycol derivatives can suitably be recycled into the system to yield additional ethylene glycol ester. High-boiling ether-alcohols and their derivatives can also be recycled.

The esters prepared by the process of this invention find ready use as solvents and plasticizers. For eaxmple, ethylene glycol diacetate may be used as a solvent or an intermediate to prepare ethylene glycol or vinyl acetate.

EXAMPLES

The following examples are presented to further illustrate this invention but are not intended as limiting the scope thereof. Unless otherwise stated, all parts and percents in the following examples are on a weight basis.

Example I

To a one-liter titanium autoclave, fitted with an agitator, are charged 450 grams of acetic acid, 20 grams of lithium bromide, 20 grams of water and 5 grams of selenium dioxide. After charging, the autoclave is pressured to 300 p.s.i.g. with nitrogen. Following pressurization, a gas flow of 40 liters per hour oxygen, 60 liters per hour ethylene and 210 liters per hour of ethane is started. (Gas flow rates are measured at 0° C. and 760 mm. Hg.) Upon commencement of gas flow, heat is applied to the autoclave, and gas flow is continued while the autoclave is heated to a temperature of 200° C. The autoclave is maintained at 200° C. for 2 hours, at the end of which gas feed is discontinued and the autoclave contents are quickly cooled with the aid of cooling coils deposited within the autoclave. After cooling, the autoclave is depressured, and the liquid contents of the autoclave are removed and analyzed. Analysis shows concentration of glycol moieties (ethylene glycol diacetate, ethylene glycol monoacetate, ethylene glycol, diethylene glycol, triethylene glycol and the acetates of diethylene glycol and triethylene glycol expressed as equivalents of ethylene glycol diacetate) of 53 wt. percent within the liquid phase.

Example II

Example I is repeated except that 2.84 grams of selenine (i.e., hydrogen selenide) are employed instead of the selenium dioxide of Example I. Analysis shows a glycol moiety concentration on the same basis as that defined in Example I of 50.3 wt. percent.

Example III

Example I is repeated except that 3.5 grams of elemental selenium powder are employed in place of the selenium dioxide of Example I. Analysis shows a concentration (on the same basis as that defined in Example I) of 50.0% of glycol moieties.

Example IV

Example I is again repeated, this time with 5.0 grams of selenium bromide in place of the selenium dioxide of Example I. Glycol moiety concentration in the effluent is 47 wt. percent.

Example V

In this example, the lithium bromide and water employed in Example I are replaced with 40 grams of a 48 wt. percent aqueous HBr solution. Upon completion of the procedure set forth in Example I, glycol moiety concentration in the liquid phase is found to be 55 wt. percent.

Example VI

The procedure of Example V is repeated at 170° C. for 4 hours. A 32% concentration of glycol moiety is obtained.

Example VII

Example I is again repeated employing chloroethyl acetate in place of lithium bromide. The amount of organo-halogen added is equivalent on a molar basis to the amount of halogen employed in Example I. Analysis shows a glycol moiety concentration in the liquid phase of 30 wt. percent, after 6 hours.

Example VIII

Example I is again repeated employing only 1 gram of selenium dioxide rather than the 5 grams used in Example I. Analysis shows a glycol moiety concentration in the liquid phase exceeding 45 wt. percent.

Example IX

The foregoing examples are repeated employing, instead of acetic acid, equimolar amounts of formic acid and isobutyric acid. Comparable concentrations of the corresponding formates and isobutyrates to those presented in the foregoing examples are obtained.

The foregoing description illustrates the methods of this invention. It will be understood that modifications and variations may be effected by those skilled in the art without departing from the spirit of this invention. Accordingly, it is intended that all matter contained in the foregoing description shall be interpreted as illustrative and not in a limiting sense.

What is claimed is:

1. A process for preparing an ethylene glycol ester which comprises oxidizing ethylene with molecular oxygen in the presence of a liquid phase reaction medium containing a $C_1$–$C_5$ hydrocarbyl aliphatic monobasic carboxylic acid, said oxidation being carried out in the presence of cationic selenium and at least one halogenated substance selected from the group consisting of elemental bromine, elemental chlorine, a bromine-containing compound yielding bromine ions during reaction and a chlorine-containing compound yielding chlorine ions during reaction.

2. A process in accordance with claim 1 wherein the carboxylic acid is acetic acid.

3. A process in accordance with claim 1 wherein the weight percent of halogen based on liquid phase medium is from 0.01% to 30% and the concentration of selenium cation present, expressed in terms of equivalents of cation per equivalent of halogen, is from about 1:0.01 to about 1:100.

4. A process in accordance with claim 1 wherein the temperature is from 50° C. to the bubble point of the liquid phase reaction medium.

References Cited

UNITED STATES PATENTS 3,427,348   2/1969   Olson _____ 260—497 R

LORRAINE A. WEINBERGER, Primary Examiner

R. D. KELLY, Assistant Examiner